May 2, 1950  F. F. RIKE ET AL  2,505,992
VALVE
Filed April 27, 1946  2 Sheets-Sheet 1
FIG. 1
FIG. 2
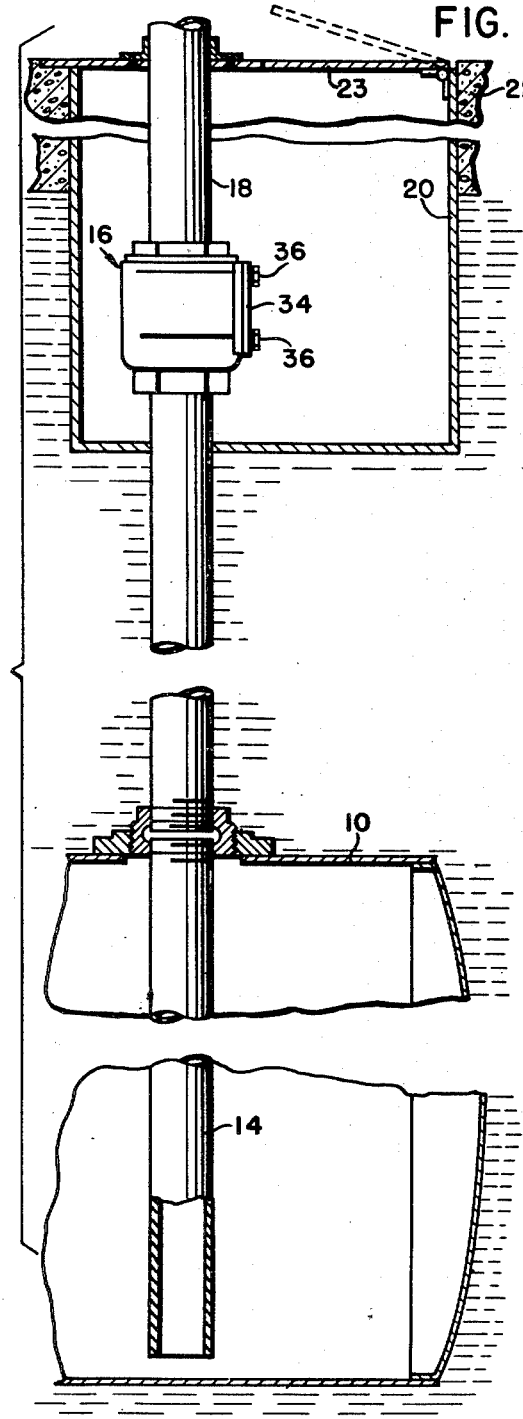
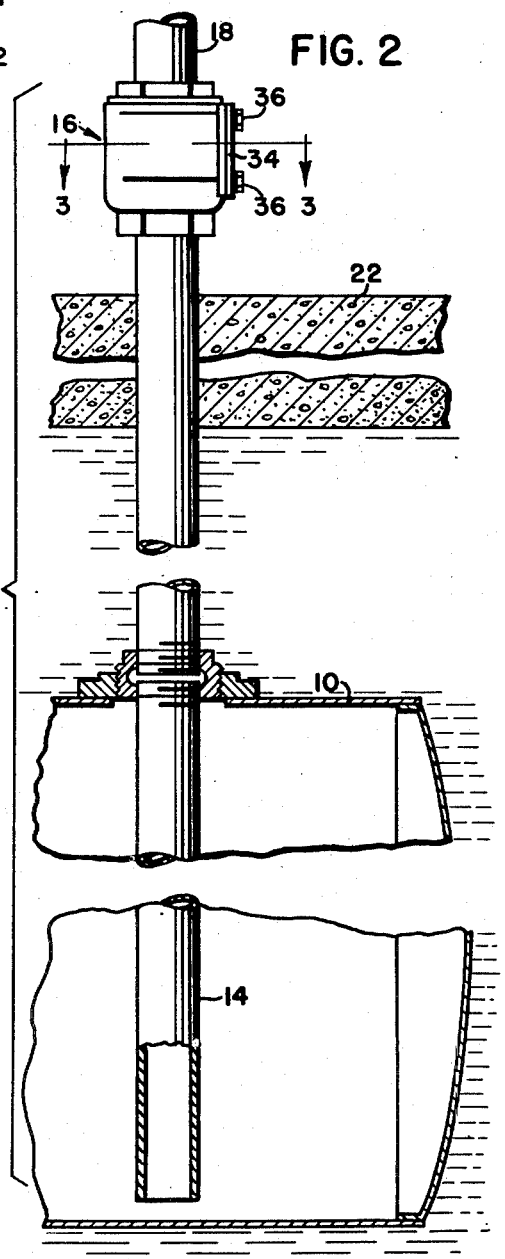
INVENTORS
FRED F. RIKE
HOWARD W. WEBB
BY Toulmin & Toulmin
ATTORNEYS May 2, 1950  F. F. RIKE ET AL  2,505,992
VALVE
Filed April 27, 1946  2 Sheets-Sheet 2

INVENTORS
FRED F. RIKE
HOWARD W. WEBB
BY Toulmin & Toulmin
ATTORNEYS

Patented May 2, 1950

2,505,992

UNITED STATES PATENT OFFICE 2,505,992

VALVE

Fred F. Rike, Dayton, and Howard W. Webb, Oakwood, Ohio, assignors to Buckeye Iron & Brass Works, Dayton, Ohio, a corporation of Ohio Application April 27, 1946, Serial No. 665,510

1 Claim. (Cl. 251—144)

This invention relates to valves and in particular to check valves having replaceable parts.

The primary object of this invention is to provide a valve having removable parts which may readily be taken out of the valve body for inspection or replacement without removing the valve from the line in which it is connected.

Another object is to provide a valve in which the operating parts thereof are removable and which is especially designed to facilitate the easy removal of the said parts.

Still another object is to provide a valve for use in systems from which explosive or corrosive vapors may emanate which may be readily serviced without breaking the line in which it is placed.

These and other objects and advantages will become more apparent upon reference to the following description and the accompanying drawings in which:

Figure 1 shows a portion of a fluid system having an underground tank and a valve according to this invention connected in a suction line and located in a manhole or pit below ground level;

Figure 2 is a similar view showing the valve located above ground level;

General arrangement

Figure 3:
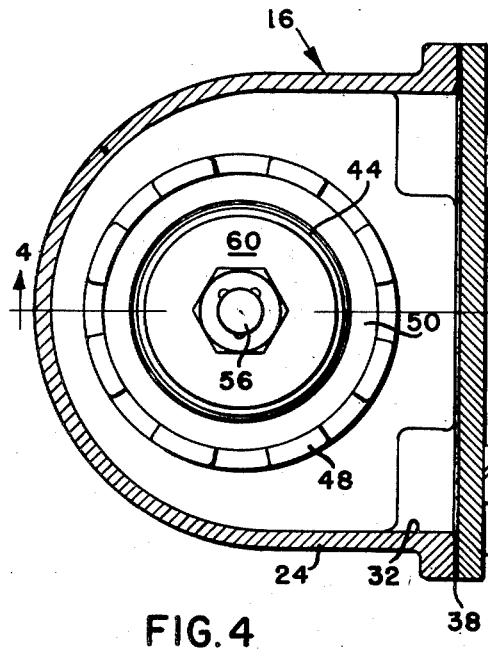
Figure 3 is a plan section through the valve and is indicated by the line 3—3 on Figure 2.

In fluid systems having an underground tank, such as gasoline pumping systems, it is necessary to provide a valve between the tank and the pump to prevent the suction line from draining back to the tank when the pump is idle.

By maintaining the suction pipe between the tank and the pump substantially filled at all times, when a pumping operation is commenced, liquid is immediately available at the pump discharge.

Often a foot valve is located within the tank and near the lower surface thereof where it is relatively inaccessible for servicing or replacement if it should become worn or faulty in operation for any reason. Accordingly, it is highly desirable to provide the suction line with a valve located outside of the tank. By so locating the valve, servicing, inspection, or replacement of the parts thereof is more readily accomplished than if the valve were in the tank.

According to the present invention there is provided a straight flow valve having a body that receives pipes at opposite end thereof and which has a service opening in the side closed by a cover plate. Within the valve there is a removable valve seat and valve member cooperating with said seat which may be extracted from the valve through the side opening. Preferably, the valve seat and member form an assembly which is clamped in place by a suitable locking ring.

In the present invention, the side opening through which the removable parts are extracted has a relatively wide angle to permit easy rotation of the locking ring by a suitable wrench or steel bar. After the locking ring has been loosened, the wide opening permits the repairman to reach inside the valve body to remove the ring therefrom and thereafter to remove the aforementioned assembly of valve member and seat. After servicing the assembly, or inspection, the parts are re-assembled within the valve casing and the cover plate re-attached and the system is again ready for operation.

Structural arrangement

Referring to the drawings, in Figure 1 there is shown an underground tank at 10 within which extends a suction pipe 14. The suction pipe leads to the lower port in a valve according to this invention at 16.

The upper end of the valve is connected with the suction pipe 18 which leads to a pump or dispensing mechanism. In Figure 1 the valve 16 is located within a manhole 20 which is recessed in the ground as beneath the concrete panel 22 and which has the hinged lid 23 by means of which access may be had to the valve 16.

In Figure 2 a similar arrangement is shown and wherein corresponding parts bear the same reference numerals, except that the manhole is eliminated and the valve 16 is located above the level of the concrete slab 22.

Figure 4:
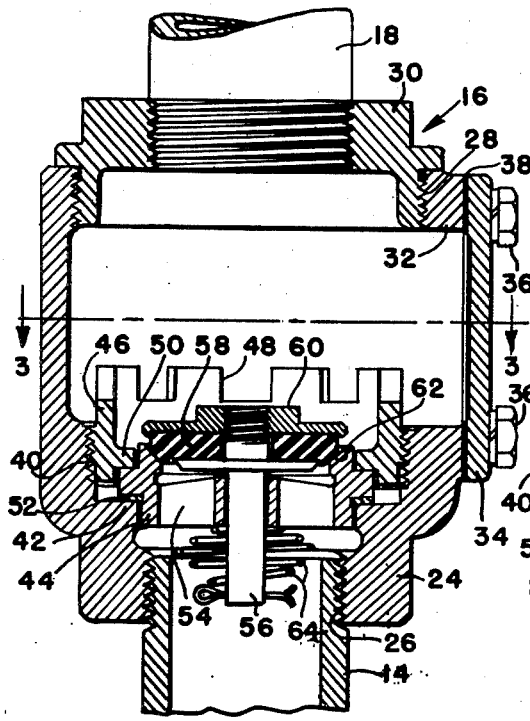
Figure 4 is a vertical section through the valve and is indicated by the line 4—4 on Figure 3.

The construction of the valve 16 is more particularly shown in Figures 3 and 4. In these figures it will be seen that the valve comprises a body or casing 24 which has a threaded opening 26 at the bottom thereof that receives the suction pipe 14. The upper end of the casing 24 is threaded as at 28 for receiving a bushing 30 that is in turn provided with a threaded bore to receive the end of the suction pipe 18. Optionally, the valve may be provided with flanged connections for receiving the conduits 14 and 18.

The casing 24 also comprises the relatively wide aperture 32 which is covered by a cover plate 34 retained in position by the cap screws 36. A gasket 38 may be provided between the cover 32 and the casing 24 to prevent leakage of fluid from the valve.

Within the valve and adjacent the lower end thereof there is a shouldered bore of which the upper part is threaded as at 40 and the lower part as at 42 provides a smooth shoulder. Loosely receivable in the portion 42 of the aforementioned bore is an annular seat ring 44 which has a depending skirt extending into the smallest part of the bore 42 and an annular rib which overlies the shoulder of the said bore.

A clamping ring 46 having an upstanding castellated rib 48 thereon is threaded into the portion 40 of the bore in the casing and has an annular rib 50 that overlies the annular rib on the seat ring. By tightening the clamping ring 46, the said seat ring may be tightly clamped in position. Preferably, there is a gasket provided at 52 which prevents leakage from the space above the seat ring back to the suction pipe 14.

The seat ring 44 includes a transverse rib 54 which has a central aperture therein for receiving the stem 56 of a movable valve member that also includes the composition disc 58 and the retaining plate or basket 60. The basket 60 is threaded to the stem 56 and the disc 58 is retained between the said basket and a flange on the said stem.

The disc 58 preferably has a bevel around its periphery and the seat ring 44 has a correspondingly shaped bevel which cooperate as at 62 to prevent fluid flow downwardly through the valve. Optionally, there may be provided a light spring 64 for retaining the movable valve member in seated engagement with the seat ring when fluid is not flowing through the valve.

Figure 5:
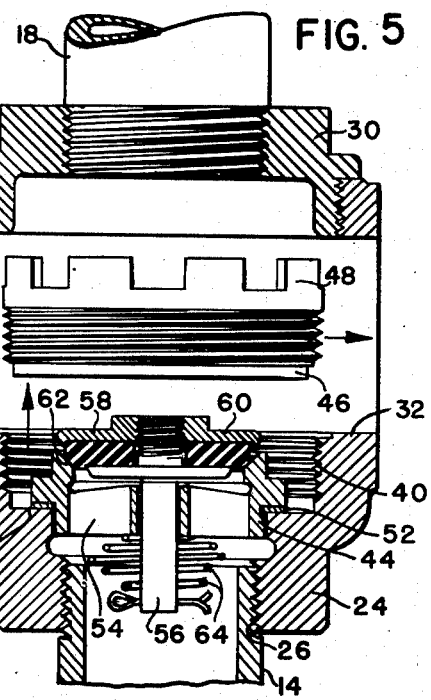
Figure 5 is a view showing the valve in the process of having its operating parts removed therefrom.

Should servicing of the valve member or valve seat or the sealing gasket within the valve become necessary, this may be accomplished by disassembling the valve as shown in Figure 5. In Figure 5 the cover plate 34 has been removed by removing the screws 36. Thereafter, the locking ring 46 is unscrewed by introducing a suitable wrench means through the aperture 32 and unthreading the said ring from the threaded bore 40. When the locking ring has been unscrewed, it may be lifted, as shown in Figure 5, and thereafter extracted through the aperture 32.

After the ring has been removed, the valve member and seat assembly may be removed in the same manner. After inspection, repair or replacement of the valve member and seat assembly, the valve is re-assembled by first placing the valve assembly in the valve casing, thereafter re-inserting the locking ring and threading it into clamping engagement with the said assembly, and finally replacing the cover plate and its clamping screws 36.

It will be apparent that the present invention provides a ready means for servicing a check valve, especially in a system including a tank, which is appreciably more convenient than if the said valve were located within the tank. Emptying of the tank, digging to gain access to the tank, and working in close quarters or in poisonous, corrosive or explosive vapors is substantially eliminated.

Figure 6:
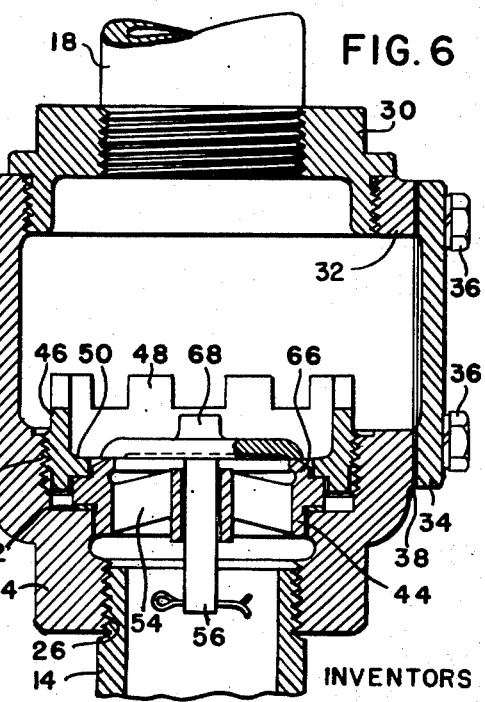
Figure 6 is a view like Figure 4 but showing a somewhat modified construction of the operating parts.

In Figure 6 there is illustrated a somewhat modified construction wherein the movable valve member has no composition disc but is formed of metal and finished together with the valve seat in order to provide an adequate checking action. The parts in Figure 6 which are similar to those in Figure 4 are identified by corresponding numbers and the valve seat ring is indicated at 66 and the valve member at 68.

While the parts of the valve may be formed of any suitable material, it is preferable, in the case of fuel systems and the like where the liquids are not corrosive, to form the casing and cover plate of the valve from cast iron and the bushing, locking ring and seat ring and valve member assembly from a brass or bronze. When corrosive fluids or acids are to be handled, it is preferable that the entire valve be constructed of a non-corrosive substance such as brass or a stainless steel.

It will be seen that a valve constructed according to this invention is widely adaptable for varied services, is relatively simple to construct and has the advantage of being extremely easy to service. Furthermore, the servicing can be accomplished without loosening or breaking the joints in the conduit in which the valve is placed, this being of the utmost importance when the fluid passing through the said conduit is of explosive or corrosive nature.

It will be understood that this invention is susceptible to modification in order to adopt it to different usages and conditions and, accordingly, it is desired to comprehend such modifications within this invention as may fall within the scope of the appended claim.

We claim:

In a check valve, a hollow valve casing having aligned openings for receiving the ends of conduits, a shoulder in said valve casing, a detachable valve seat having a flange to engage said shoulder, said seat including a centrally disposed hub member having an aperture, a valve member provided with a stem and movably associated with said seat for controlling the fluid flow through said valve, said stem being slidably received by said aperture and extending beyond the hub member, a spring for yieldably holding the valve member against the seat, said spring surrounding the extended portion of said stem and held under compression between the free end of the stem and said hub member, a clamping ring threaded into said valve casing and clamping said seat against said shoulder, said ring being positioned in line with said openings and free from obstruction to fluid flow through its entire length, and means for gaining access to said valve seat and member from said casing without disconnecting said conduits comprising an opening in the side of the valve casing and between said aligned openings, and a cover plate detachably secured thereto.

FRED F. RIKE.
HOWARD W. WEBB.

REFERENCES CITED

The following references are of record in the file of this patent:

UNITED STATES PATENTS

| Number | Name | Date |
|---|---|---|
| 871,357 | Newcomb | Nov. 19, 1907 |
| 1,125,315 | Hayward | Jan. 19, 1915 |
| 1,679,283 | Wills | July 31, 1928 |
| 2,014,008 | Stockdale | Sept. 10, 1935 |
| 2,336,473 | Eilers | Dec. 14, 1943 |